United States Patent
Hakamata (10) Patent No.: US 7,135,695 B2
(45) Date of Patent: Nov. 14, 2006

(54) LINE LIGHT SOURCE SYSTEM

(75) Inventor: Kazuo Hakamata, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 10/652,481

(22) Filed: Sep. 2, 2003

(65) Prior Publication Data
US 2004/0046134 A1   Mar. 11, 2004

(30) Foreign Application Priority Data
Sep. 5, 2002   (JP)   ............... 2002-260078
Dec. 27, 2002   (JP)   ............... 2002-380592

(51) Int. Cl.
G01N 23/04   (2006.01)
G01T 1/105   (2006.01)
G02B 26/10   (2006.01)
G03B 42/08   (2006.01)
H01L 31/14   (2006.01)
G11B 7/00   (2006.01)

(52) U.S. Cl. .............. 250/585; 250/553; 250/591; 369/121

(58) Field of Classification Search ........ 250/580–585, 250/591, 553, 484.4
See application file for complete search history.

(56) References Cited

U.S. PATENT DOCUMENTS

| | | | |
|---|---|---|---|
| 3,850,517 A | 11/1974 | Stephany et al. | |
| 4,176,275 A | 11/1979 | Korn et al. | |
| 4,922,103 A * | 5/1990 | Kawajiri et al. | 250/586 |
| 5,440,146 A | 8/1995 | Steffen et al. | |
| 5,477,438 A | 12/1995 | Nakata et al. | |
| 5,510,626 A | 4/1996 | Nelson et al. | |
| 6,710,365 B1 * | 3/2004 | Kohda | 250/586 |
| 6,759,662 B1 * | 7/2004 | Li | 250/458.1 |
| 6,787,790 B1 * | 9/2004 | Shoji | 250/585 |
| 6,798,440 B1 * | 9/2004 | Yasuda | 347/244 |
| 2001/0025936 A1 | 10/2001 | Shoji | |

FOREIGN PATENT DOCUMENTS

| | | |
|---|---|---|
| JP | 08110203 A * | 4/1996 |
| JP | 2000-105297 A | 4/2000 |
| JP | 2001-290228 A | 10/2001 |

OTHER PUBLICATIONS

Grin and Selfoc. Information sheet [online]. NSG America, Inc, 2000 [retrieved on Mar. 3, 2005]. Retrieved from the Internet: <URL:web.archive.org/web/20001202211000/http://www.nsgamerica.com/>.*

Donald M. Korn et al., A Method of Electronic Readout of Electrophotographic and Electrographic Images, Journal of Applied Photographic Engineering, vol. 4, No. 4, Fall 1978 pp. 178-182.

* cited by examiner

Primary Examiner—David Porta
Assistant Examiner—Frederick F. Rosenberger
(74) Attorney, Agent, or Firm—Sughrue Mion, PLLC

(57) ABSTRACT

A line light source system includes a line light source formed by a number of linearly arranged light emitting elements. A pair of cylindrical lenses converges the light bundles emitted from the respective light emitting elements in a direction perpendicular to the direction in which the light emitting elements are arranged, and a pinhole array limits the angle of divergence of the light bundles emitted from the respective light emitting elements with respect to the optical axis of the cylindrical lenses in a direction parallel to the direction in which the light emitting elements are arranged.

8 Claims, 11 Drawing Sheets

PRIOR ART

FIG.9B

PRIOR ART

LINE LIGHT SOURCE SYSTEM

BACKGROUND OF THE INVENTION

1. Field of the Invention

This invention relates to a line light source system which can be used, for instance, a light source system for irradiating a line-like area of an image recording medium.

2. Description of the Related Art

There have been known systems in which a photoconductive member such as a selenium plate (comprising an a-Se layer sensitive to X-rays) is employed as an electrostatic recording medium (sometimes referred to as "a solid sensor") in order to reduce the amount of the radiation to which the examinee is exposed, the electrostatic recording medium is exposed to radiation such as X-rays carrying thereon a radiation image, thereby causing the electrostatic recording medium to store latent image charges representing the radiation image, and then the latent image or radiation image information representing the radiation image represented by the latent image charges is read by causing a laser beam to scan the electrostatic recording medium and detecting the electric current generated in the electrostatic recording medium upon exposure to the laser beam by flat electrodes or stripe electrodes. See, for instance, U.S. Pat. Nos. 4,176,275, 5,440,146 and 5,510,626 and "A Method of Electronic Readout of Electrophotographic and Electroradiographic Image"; Journal of Applied Photographic Engineering Volume 4, Number 4, Fall 1978, pp. 178 to 182.

We, this applicant, have proposed an electrostatic recording medium comprising a first conductive layer permeable to recording radiation, a recording photoconductive layer which exhibits conductivity upon exposure to the recording radiation, a charge transfer layer which behaves like a substantially insulating material to a charge in the same polarity as that in which the first conductive layer is charged and behaves like a substantially conductive material to a charge in the polarity opposite to that in which the first conductive layer is charged, a reading photoconductive layer which exhibits conductivity upon exposure to reading light and a second electrode layer permeable to the reading light which are superposed one on another in this order is used, and a read-out apparatus for reading radiation image information from the electrostatic recording medium on which the radiation image information has been recorded. See, for instance, Japanese Unexamined Patent Publication No. 2000-105297.

In the read-out apparatus disclosed in Japanese Unexamined Patent Publication No. 2000-105297, an electrostatic latent image recorded on the electrostatic image recording medium is read by causing reading light to two-dimensionally scan the electrostatic recording medium. The light source systems outputting the reading light include, for instance, a spot beam projecting means which causes a spot beam, e.g., a laser beam, to scan the electrostatic recording medium in both the main scanning and sub-scanning directions, and a line beam projecting means which causes a line beam extending in the main scanning direction to scan the electrostatic recording medium only in the sub-scanning direction. The line beam may be emitted from a line light source comprising, for instance, a number of linearly arranged light emitting elements.

As the line light source system, there has been known that in which a number of LED's are arranged in an array as disclosed, for instance, in Japanese Unexamined Patent Publication No. 2001-290228. LED's are high in light output efficiency for given input energy and are low in cost as compared with lasers or the like. When the line light source system of an LED array is employed, light emitted from the LED's is linearly focused on the electrostatic recording medium to project a line beam thereonto by, for instance, a cylindrical lens disposed in parallel to the row of the LED's (the direction in which the LED's are arranged), and the line beam is caused to scan the electrostatic recording medium in the sub-scanning direction.

Figure 8A:
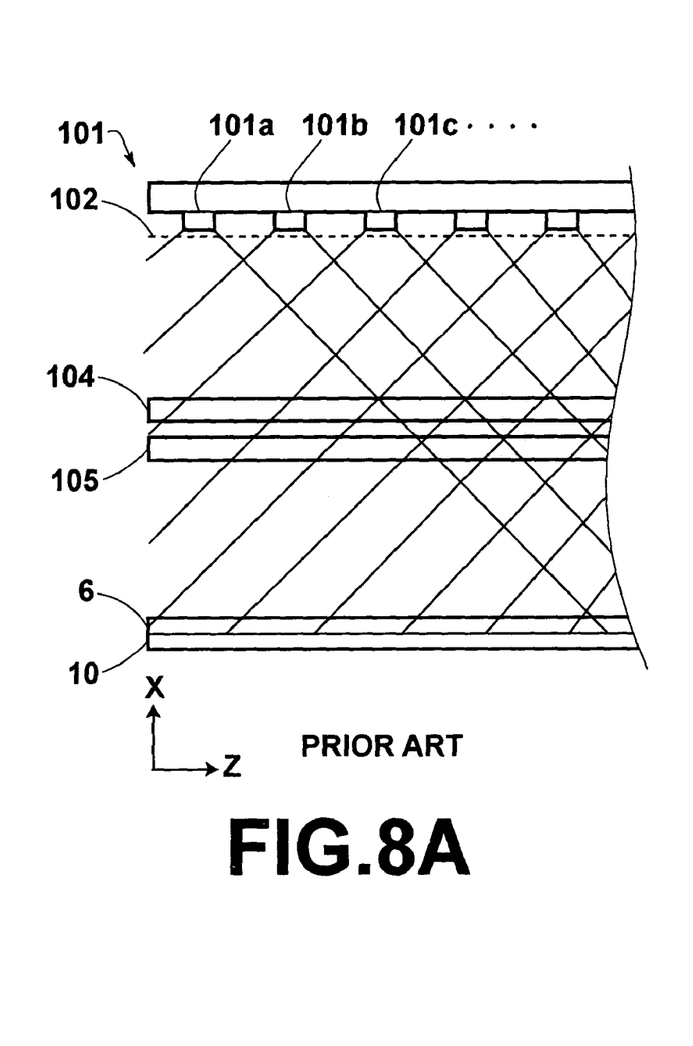
FIGS. 8A and 8B and FIGS. 9A and 9B are views for illustrating the drawbacks of the conventional line light source system.
Figure 8B:
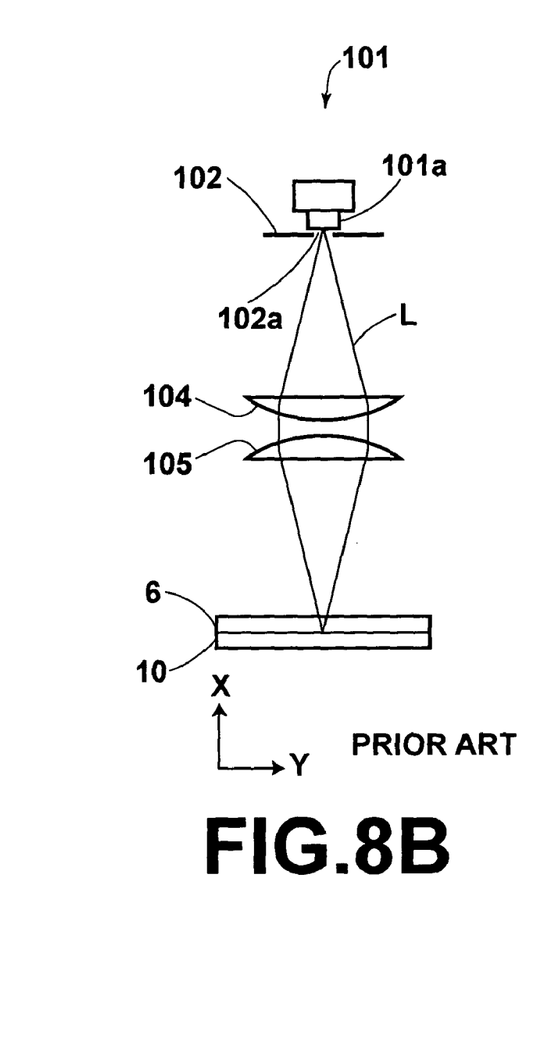

An example 200 of the reading light source system comprising a line beam projecting means will be described with reference to FIGS. 8A and 8B. FIG. 8A is a side view showing the reading light source system 200 of this example as seen in Y-direction and FIG. 8B is a cross-sectional view taken along an X-Y plane. As shown in FIGS. 8A and 8B, the reading light source system 200 comprises a line light source 101 comprising a plurality of linearly arranged surface-emitting LED chips 101a, 101b, 101c . . . , a slit plate 102 having a slit 102a extending in the longitudinal direction of the line light source 101 and a pair of cylindrical lenses 104 and 105 (an optical means) which image reading light L passing through the slit 102a on an electrostatic recording medium 10 disposed on a glass base 6. The slit plate 102 limits the angle of divergence in the Y-direction of the reading light L as output from the line light source 101. That is, the reading light emitted from the LED chips 101a, 101b, 101c . . . is shaped by the slit plate 102 and converged in the Y-direction by the cylindrical lenses 104 and 105, and then projected onto the electrostatic recording medium 10. Since the reading light emitted from each of the LED chips 101a, 101b, 101c . . . is not converged in Z-direction in which the LED chips 101a, 101b, 101c . . . are arranged (the longitudinal direction of the line beam projecting means), the reading light L irradiates a line-like area of the electrostatic recording medium 10.

However, the conventional reading light source is disadvantageous in that since the angle of divergence of the reading light L is not limited in the direction of the row of the light emitting elements (the longitudinal direction of the line beam projecting means), the line reading light beam L includes therein a plurality of light bundles which are focused on different points when converged in the direction perpendicular to the longitudinal direction of the line beam projecting means by the optical means. Accordingly, in the line beam on the image recording medium, light bundles in focus and light bundles out of focus mingle with each other. Light bundles out of focus increase flares and enlarge the width of the line light beam.

Why the line reading light beam L includes therein a plurality of light bundles which are focused on different points when converged in the direction perpendicular to the row of the light emitting elements by the optical means will be described with reference to FIGS. 9A and 9B, hereinbelow.

Figure 9A:
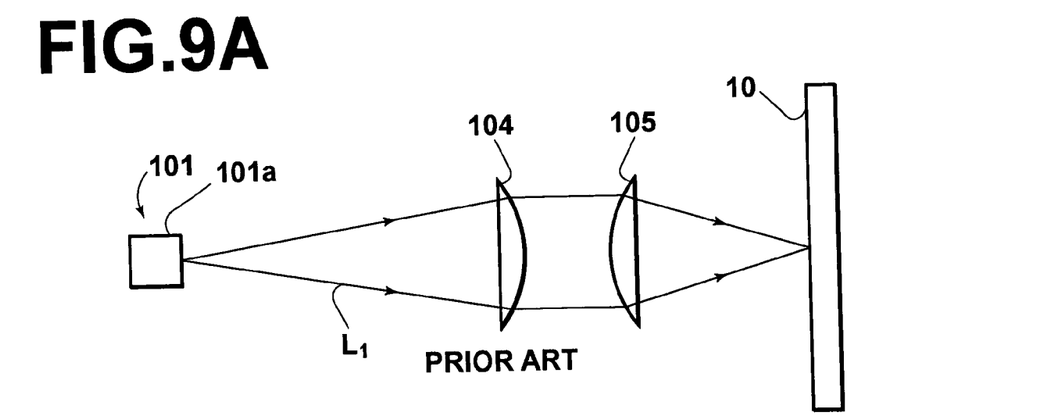
Figure 9B:
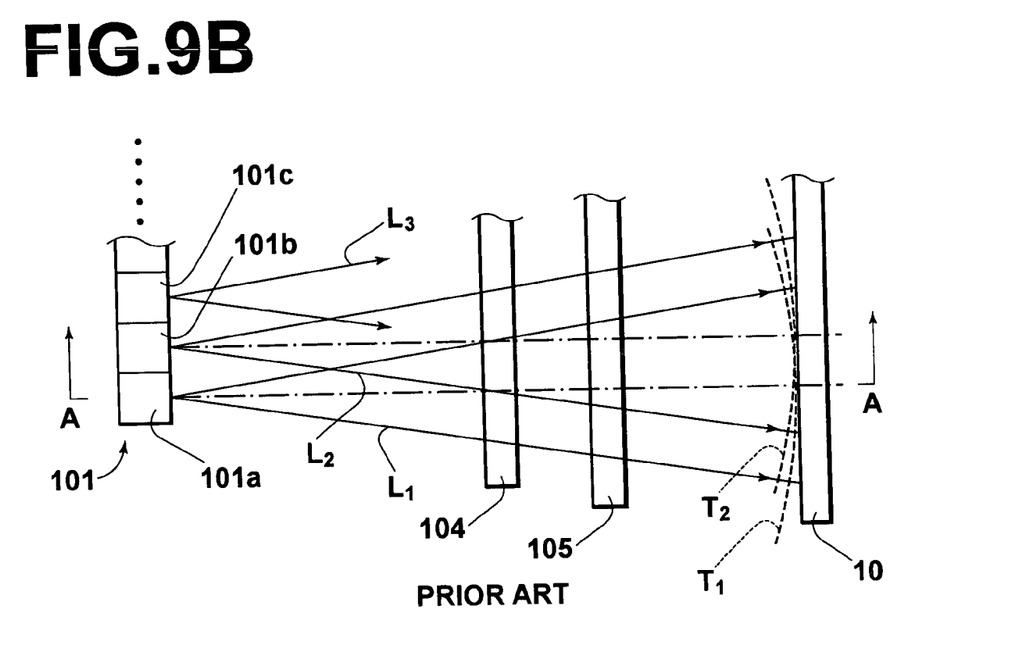

FIG. 9B is a plan view showing an example of the line light source system and FIG. 9A is a cross-sectional view taken along line A—A in FIG. 9B. The structure of this example is substantially the same as that shown in FIGS. 8A and 8B. Accordingly, the elements analogous to those shown in FIGS. 8A and 8B are given the same reference numerals and will not be described here.

As shown by broken lines T1, T2 . . . in FIG. 9B, the light bundles L1, L2, L3 . . . comes to be focused by the cylindrical lenses 104 and 105 on a point nearer to the cylindrical lenses in a plane parallel to the row of the LED chips as the distance from the axis of light emission of each of the LED chips 101a, 101b, 101c . . . increases.

Further, there has been a problem that the line reading light beam projected onto the image recording medium is not uniform in its intensity in the longitudinal direction of the line beam projecting means. That is, in a middle portion of the line reading light beam projected on the image recording medium, the intensity of the line light beam is higher since light bundles emitted from a larger number of light emitting elements are superimposed in the middle portion. Since light bundles emitted from a smaller number of light emitting elements are superimposed towards the ends of the line reading light beam, the intensity of the line light beam becomes lower towards the ends of the line reading light beam.

Further, a part of the reading light emitted from light emitting elements disposed near the ends of the line light source is reflected by the casing of the line light source, which increases flares and deteriorates the sharpness of the image information read out.

SUMMARY OF THE INVENTION

In view of the foregoing observations and description, the primary object of the present invention is to provide a line light source system which can correctly focus substantially all the light bundles emitted from the light emitting elements, and can project a line beam which is small in width and is uniform in intensity in the longitudinal direction of the line beam projecting means.

In accordance with a first aspect of the present invention, there is provided a line light source system comprising a line light source, an optical means which converges the light bundles emitted from the line light source in a direction perpendicular to the longitudinal direction of the line light source, and a pinhole array which limits the angle of divergence of the light bundles emitted from the line light source with respect to the optical axis of the optical means in the longitudinal direction of the line light source.

The pinhole array need not be limited to those having circular pinholes but may be any so long as it has optical openings which limit the angle of divergence of the light bundles emitted from the line light source with respect to the optical axis of the optical means in the longitudinal direction of the line light source. For example, the pinhole array may be an array of rectangular pinholes, or an array of a plurality of refractive index profile type filters. The line light source may comprise a number of linearly arranged light emitting elements. Each of the light emitting elements may be, for instance, an LED. Further, the line light source may comprise one or more inorganic or organic EL.

The line light source system in accordance with the first aspect of the present invention may be employed as a light source system for exposing to reading light an image recording medium such as a solid sensor or an electrostatic recording medium which stores image information as an electrostatic latent image upon exposure to light bearing thereon image information and generates an electric current according to the image information upon exposure to the reading light or a stimulable phosphor sheet which stores the image information upon exposure to light bearing thereon image information and emits light according to the image information stored therein upon exposure to the reading light (stimulating light).

The reading light may be any electromagnetic wave of any wavelength so long as it can be employed to read out the image information stored in the image recording medium without being limited to infrared rays, visible rays or ultraviolet rays. That is, in the case where a solid sensor or an electrostatic recording medium is employed as the image recording medium, the reading light may be an electromagnetic wave of any wavelength so long as it can cause the solid sensor or the electrostatic recording medium to generate an electric current according to the image information stored thereon, and in the case where a stimulable phosphor sheet is employed as the image recording medium, the reading light may be an electromagnetic wave of any wavelength so long as it can cause the stimulable phosphor sheet to emit light according to the image information stored thereon.

In the line light source system in accordance with the first aspect of the present invention, by virtue of the pinhole array which limits the angle of divergence of the light bundles emitted from the line light source with respect to the optical axis of the optical means in the longitudinal direction of the line light source, the angle of divergence of the light bundles emitted from the line light source in the longitudinal direction of the line light source is smaller as compared with in the conventional line light source system, whereby fluctuation in the focal points is suppressed. As a result, flare is suppressed and the width of the line light beam is narrowed.

Further, since the number of the light bundles superimposed in a middle portion of the line light beam is reduced, the intensity of the light near the ends of the line light beam can be equivalent to that in the middle portion. That is, the intensity of the light is weakened only at the portions extremely near to the ends of the line light beam and the line light beam can be more uniform in intensity in the longitudinal direction of the line light source. As a result, the reliability of the read image information can be improved.

Further, since the amount of the light reflected by the casing of the line light source is reduced, flare is suppressed as compared with the conventional line light source system and the sharpness of the image information read out is improved.

In accordance with a second aspect of the present invention, there is provided a line light source system comprising a line light source comprising a number of linearly arranged light emitting elements and a cylindrical lens which converges the divergent light bundles emitted from the respective light emitting elements only in a direction perpendicular to the direction in which the light emitting elements are arranged so that the divergent light bundles are converged on a line-like area on a surface to be exposed to the light emitted from the line light source, wherein the improvement comprises an optical element which limits the angle of divergence $\phi$ of light traveling toward the surface within the range defined by formula $$2 \times \cos^{-1}\left(1 - \frac{z}{D}\right) \geq \phi$$

wherein D represents the distance between the front imaging point and the back focus of the cylindrical lens, and z represents a desired focal depth.

The optical element may be, for instance, a pinhole array or a refractive index profile type lens array.

Also the line light source system in accordance with the second aspect of the present invention may be employed as a light source system for exposing to reading light an image recording medium such as a solid sensor or an electrostatic recording medium which stores image information as an electrostatic latent image upon exposure to light bearing thereon image information and generates an electric current according to the image information upon exposure to the reading light or a stimulable phosphor sheet which stores the image information upon exposure to light bearing thereon image information and emits light according to the image information stored therein upon exposure to the reading light.

The reading light may be any electromagnetic wave of any wavelength so long as it can be employed to read out the image information stored in the image recording medium without being limited to infrared rays, visible rays or ultraviolet rays. That is, in the case where a solid sensor or an electrostatic recording medium is employed as the image recording medium, the reading light may be an electromagnetic wave of any wavelength so long as it can cause the solid sensor or the electrostatic recording medium to generate an electric current according to the image information stored thereon, and in the case where a stimulable phosphor sheet is employed as the image recording medium, the reading light may be an electromagnetic wave of any wavelength so long as it can cause the stimulable phosphor sheet to emit light according to the image information stored thereon.

The above formula $$2 \times \cos^{-1}\left(1 - \frac{z}{D}\right) \geq \phi$$

represents the condition under which the deviation of the focal points of the light from the surface to be exposed is confined within the focal depth. So long as the above formula is satisfied, no light greatly out of focus (light traveling a distance larger than the focal depth from the focal point and greatly diverging when it impinges upon the surface to be exposed) impinges upon the surface to be exposed and accordingly substantially all the light can be imaged on the surface, whereby occurrence of flare can be suppressed.

DESCRIPTION OF THE PREFERRED EMBODIMENTS

Figure 1A:
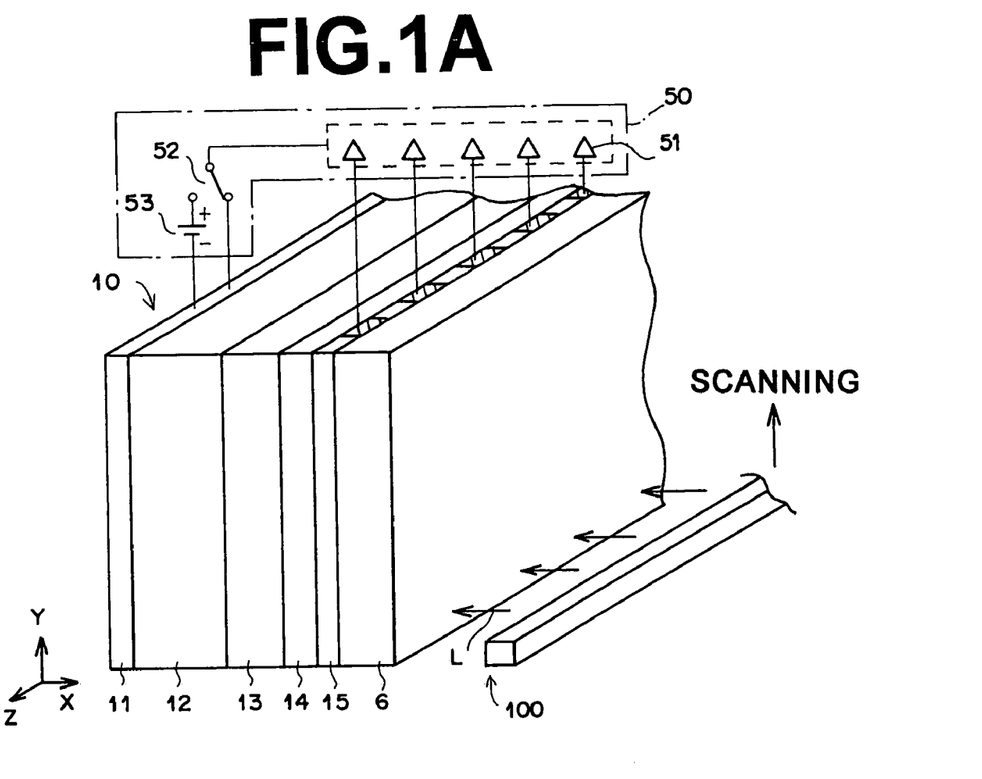
FIG. 1A is a perspective view briefly showing an image read-out system employing a line light source system in accordance with a first embodiment of the present invention.
Figure 1B:
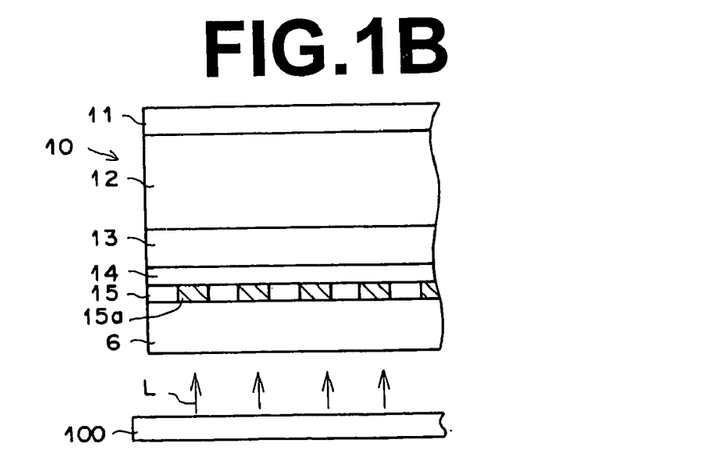
FIG. 1B is a fragmentary cross-sectional view of the image read-out system shown in FIG. 1A taken along X-Z plane.

In FIGS. 1A and 1B, a radiation image read-out system comprises an electrostatic recording medium 10, a reading light source system 100 in accordance with a first embodiment of the present invention which projects reading light beam L onto the electrostatic recording medium 10 and an electric current detecting means 50 which detects the electric current flowing out from the electrostatic recording medium 10 upon exposure to the reading light beam L.

The electrostatic recording medium 10 stores radiation image information as an electrostatic latent image upon exposure to radiation carrying thereon radiation image information, and generates an electric current according to the electrostatic latent image upon exposure to reading light. For example, the electrostatic recording medium 10 comprises a first conductive layer 11 permeable to recording radiation (e.g., an X-ray, will be simply referred to as "recording light", hereinbelow), a recording photoconductive layer 12 which exhibits conductivity upon exposure to the recording light, a charge transfer layer 13 which behaves like a substantially insulating material to a charge in the same polarity as that in which the first conductive layer is charged (charge of the latent image polarity; e.g. the negative charge), and behaves like a substantially conductive material to a charge (charge of the transfer polarity; e.g., the positive charge) in the polarity opposite to that in which the first conductive layer is charged, a reading photoconductive layer 14 which exhibits conductivity upon exposure to reading light and a second conductive layer 15 permeable to the reading light which are superposed one on another in this order. In this particular embodiment, the second conductive layer 15 comprises a stripe electrode formed by a plurality of elements (linear electrodes) 15a arranged like stripes at pixel pitches as shown by hatching in FIGS. 1A and 1B.

The electric current detecting means 50 comprises a number of current detecting amplifiers 51 each connected one of the elements 15a of the second conductive layer 15 and detects electric currents flowing through the elements 15a element by element in parallel. The first conductive layer 11 is connected to one of two inputs of a connector means 52 and the negative pole of a power source 53. The positive pole of the power source 53 is connected to the other input of the connector means 52. The connector means 52 has one output which is connected to the current detecting amplifiers 51. Each of the current detecting amplifiers 51 may be of any known structure. Depending on the structure of the current detecting amplifier 51, the connector means 52 and the power source 53 are differently connected.

Operation of the radiation image read-out system will be described, hereinbelow. When recording an electrostatic latent image on the electrostatic recording medium 10, the connector means 52 is switched to connect the power source to the current detecting amplifiers 51 and a DC voltage is applied between the first conductive layer 11 and each of the elements 15a of the second conductive layer 15, whereby an U-shaped electric field is established between the first conductive layer 11 and the element 15a of the second conductive layer 15 with the bottom of the U on the element 15a.

Then the recording light is projected onto an object (not shown) and the recording light passing through the object, that is, radiation carrying thereon radiation image information of the object, is projected onto the electrostatic recording medium. This generates charged pairs in the recording photoconductive layer 12. The negative charges of the charged pairs are attracted toward the element 15a along the electric field and stored on the interface of the recording photoconductive layer 12 and the charge transfer layer 13. The amount of the negative charges (latent image charges) stored on the interface is substantially proportional to the radiation to which the electrostatic recording medium is exposed, and the latent image charges represent an electrostatic latent image. An electrostatic latent image is thus recorded on the electrostatic recording medium. Whereas, the positive charges released from the negative charges traveling toward the element 15a are attracted toward the first conductive layer 11 and recombined with negative charges injected by the power source 53 to be cancelled.

When the electrostatic latent image is to be read out from the electrostatic recording medium, the connector means 52 is switched to connect the first conductive layer 11 to the current detecting amplifiers 51.

Then line reading light beam is output from the reading light source system 100 and impinges upon the reading photoconductive layer 14 passing through the glass base 6 and the second conductive layer 15. This generates charged pairs in the reading photoconductive layer 14. The positive charges of the charged pairs rapidly move in the charge transfer layer 13 attracted to the negative charges (latent image charges) stored on the interface of the recording photoconductive layer 12 and the charge transfer layer 13 and are recombined with the latent image charges to be cancelled. Whereas, the negative charges of the charged pairs generated in the reading photoconductive layer 14 are recombined with positive charges injected by the power source 53 and cancelled. When the negative charges stored on the interface are cancelled by the charge recombination, an electric current flows through the electrostatic recording medium 10. This electric current is detected by the current detecting amplifiers 51 connected to the element 15a and the current is detected by the elements 15a in parallel. Since the amount of electric current flowing through the electrostatic recording medium upon reading is according to the latent image charge or the electrostatic latent image, the electrostatic latent image can be read by detecting the amount of electric current flowing through the each element 15a and the first conductive layer 11. The line light source system 100 causes the line light beam to scan the electrostatic recording medium 10 in the direction of the arrow in FIG. 1A to project the line light beam over the entire area of the electrostatic recording medium 10.

Figure 2A:
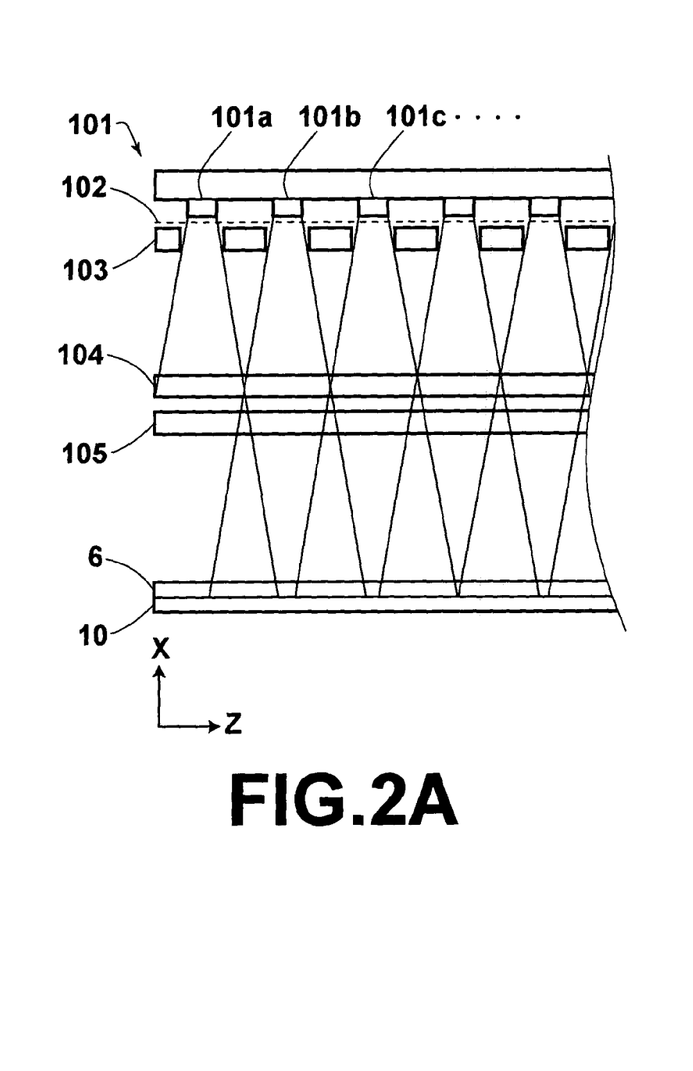
FIGS. 2A and 2B are views showing the line light source system in accordance with the first embodiment of the present invention.
Figure 2B:
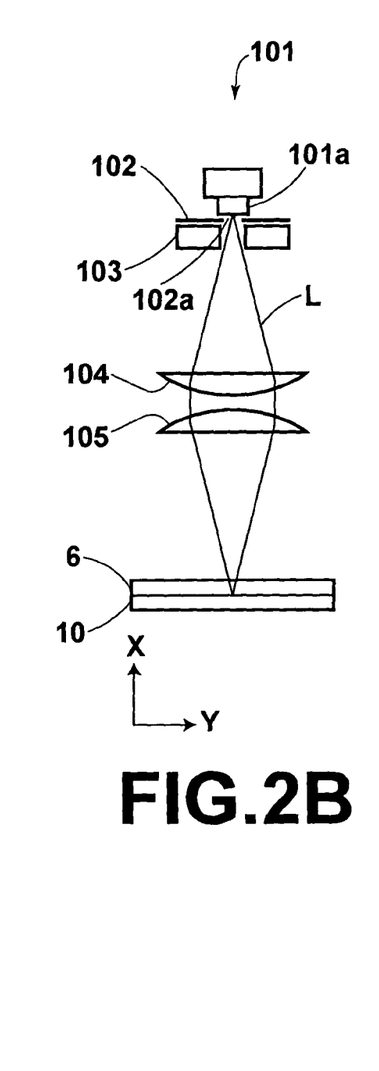

The line light source system 100 in accordance with the first embodiment of the present invention will be described with reference to FIGS. 2A and 2B, hereinbelow. FIG. 2A is a side view of the line light source system 100 as seen in Y-direction (a direction perpendicular to the longitudinal direction of the line light source), and FIG. 2B is a cross-sectional view of the line light source system 100 taken along X-Y plane. The reading light beam L travels in X-direction and the LED chips are arranged in Z-direction.

As shown in FIGS. 2A and 2B, the line light source system of this embodiment comprises a line light source 101 comprising a plurality of LED chips 101a, 101b, . . . linearly arranged in Z-direction, a slit plate 102 having a slit 102a extending in Z-direction, a pinhole array 103 in which pinholes are formed at the same pitches as the pitches at which the LED chips 101a, 101b, . . . are arranged and a pair of cylindrical lenses 104 and 105 which converges the reading light L in Y-direction.

The slit plate 102 is a field stop which limits the light emitting image of the LED chips. The slit plate 102 may be of any type so long as it can limit the effective light emitting area of the LED chips 101, 101b, . . . , and may be a plate provided with optical gaps such as refractive index profile type filters without limited to a plate provided with mechanical openings.

Figure 3A:
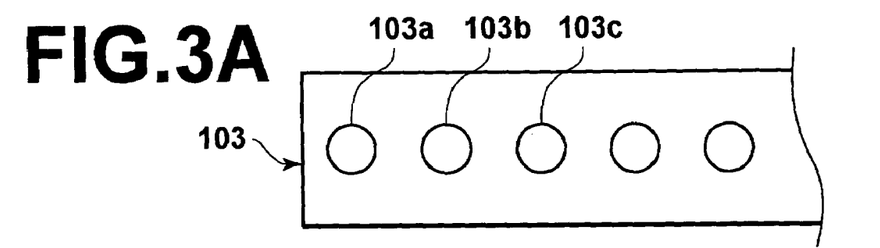
FIGS. 3A and 3B are views showing examples of the pinhole array.
Figure 3B:
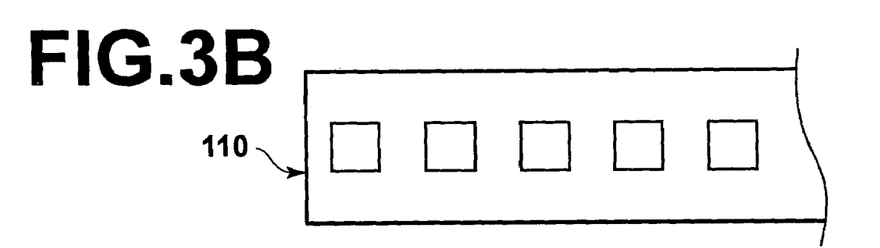

As shown in FIG. 3A, the pinhole array 103 is a plate member which is formed with a plurality of circular pinholes 103a, 103b, . . . at the same pitches as the pitches at which the LED chips 101a, 101b, . . . are arranged and has a predetermined thickness. The pinhole array 103 limits the angle of divergence of the light bundles emitted from the LED chips 101a, 101b, . . . to about 10° in all the directions. The plate member of the pin hole array 103 has been subjected to antireflection processing and reflection of the light in each pinhole is prevented. Each pinhole may be rectangular in shape as shown in FIG. 3B. Further a density filter or the like may be fitted in each pinhole.

Figure 4:
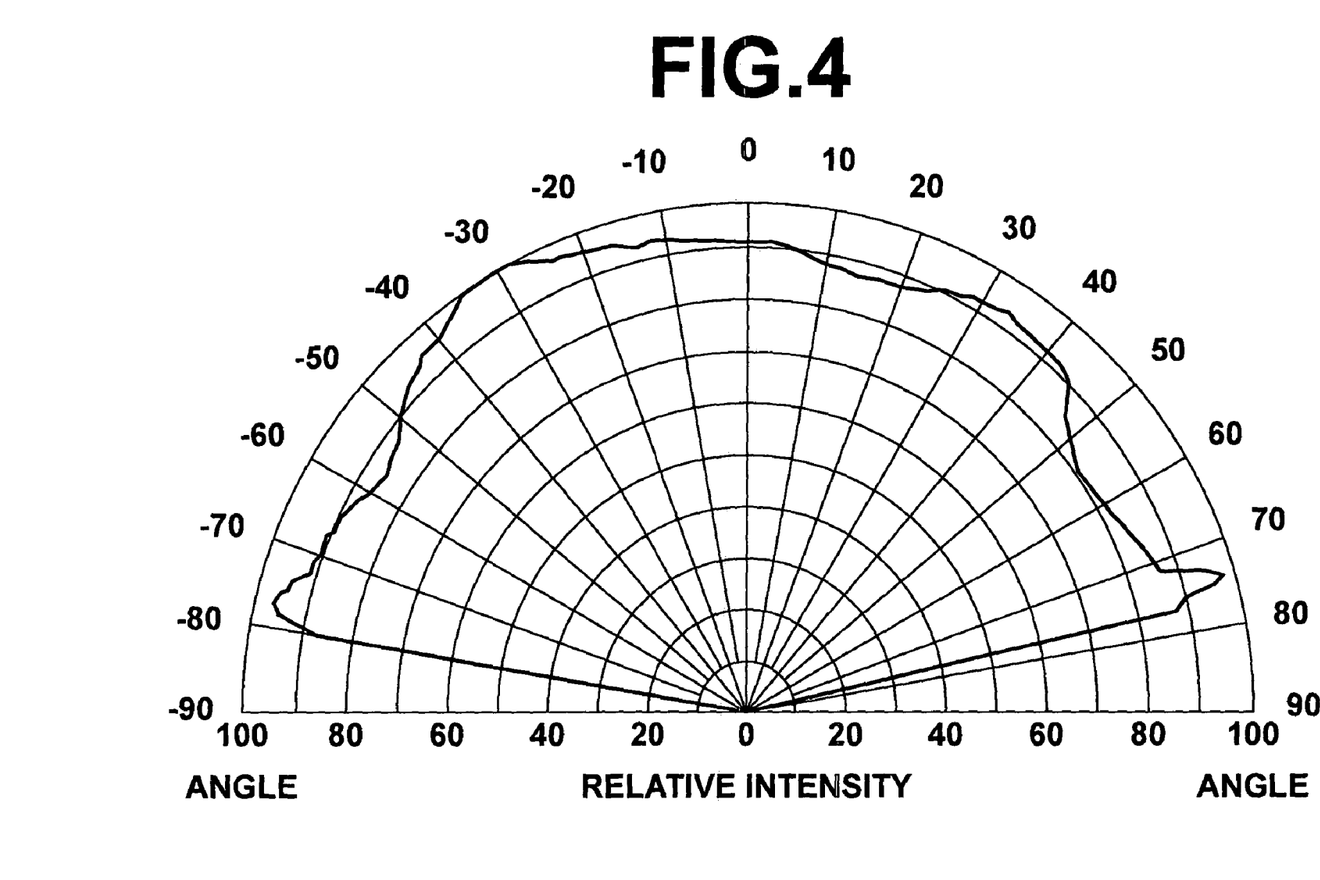
FIG. 4 is a view showing the light distribution property of the LED chip.

The light emitted from each of the LED chips 101a, 101b, . . . is projected onto the electrostatic recording medium 10 converged in Y-direction by the cylindrical lenses 104 and 105 with its light emitting image limited by the slit plate 102 and its angle of divergence in Z-direction limited by the pinhole array 103. That is, the light distribution property of the LED chip is very wide as shown in FIG. 4. Accordingly, if the angle of divergence in Z-direction of the light bundle emitted from each of the LED chips 101a, 101b, . . . is not limited by the pinhole array 103, the light bundle emitted from one of the LED chips 101a, 101b, . . . illuminates very wide area. Whereas, in this embodiment, since the angle of divergence in Z-direction is narrowed by the pinhole array 103, the light bundle emitted from one of the LED chips 101a, 101b, . . . illuminates only a limited area.

Accordingly, the number of the light bundles superimposed in a middle portion of the line light beam is reduced as compared with in the conventional system, and the intensity of the light near the ends of the line light beam can be equivalent to that in the middle portion. That is, the intensity of the light is weakened only at the portions extremely near to the ends of the line light beam and the line light beam can be more uniform in intensity in the longitudinal direction of the line light source. As a result, the reliability of the read image information can be improved.

Further, since only a part of the light is reflected by the casing of the line light source 101, flare is suppressed as compared with the conventional line light source system and the sharpness of the image information read out is improved.

Further, when light which is emitted from a point and diverges in Z-direction is converged in Y-direction by the cylindrical lenses 104 and 105, light is converged on different points by the exit angle. For example, when the electrostatic recording medium 10 is disposed on a focus, light emitted from the LED chip at an exit angle of 0° is focused on the electrostatic recording medium 10 though light emitted from the LED chip at different exit angles cannot be focused on the electrostatic recording medium 10. Accordingly, in the line beam on the image recording medium, light bundles in focus and light bundles out of focus mingle with each other. Light bundles out of focus increase flares and enlarge the width (the Y-direction dimension) of the line light beam. The larger the diversion of the light bundles emitted from the LED chips, the larger the flare of the line light beam and the larger the width of the line light beam. That is, in this embodiment, the flare of the line light beam is reduced and the width of the same is reduced by limiting the diversion of the light bundles emitted from the LED chips.

Figure 5A:
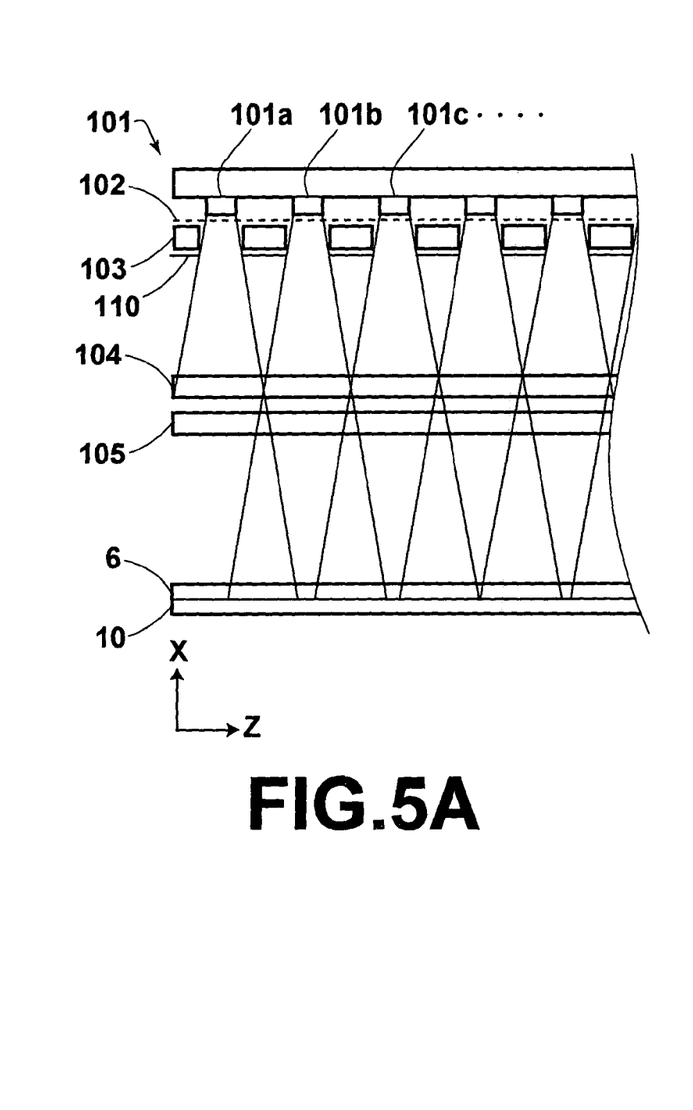
FIGS. 5A and 5B are views showing a modification of the line light source system in accordance with the first embodiment of the present invention.
Figure 5B:
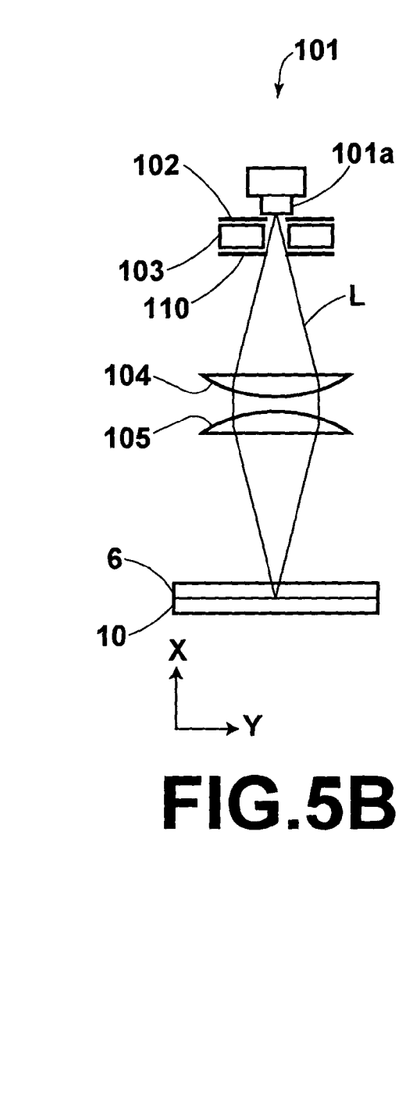

As shown in FIGS. 5A and 5B, an additional pinhole array 110 may be provided in addition to the pinhole array 103. The pinholes formed in the additional pinhole array 110 is slightly smaller than those in the pinhole array 103. By providing the additional array 110, reflection of light in the pinholes of the pinhole array 103 can be surely cut, whereby occurrence of flare can be more surely prevented. When the additional pinhole array 110 is thinner than the pinhole array 103, for instance, the thickness of the additional pinhole array 110 is 0.05 mm with the thickness of the pinhole array 103 being 2 mm, reflection of light in the pinholes of the additional pinhole array 110 can be suppressed, whereby occurrence of flare can be further more surely prevented.

Though, in the first embodiment described above, the image recording medium is an electrostatic recording medium using a stripe electrode, the image recording medium need not be limited to such an electrostatic recording medium but may be any so long as it outputs a signal representing an image recorded thereon upon exposure reading light.

Figure 6:
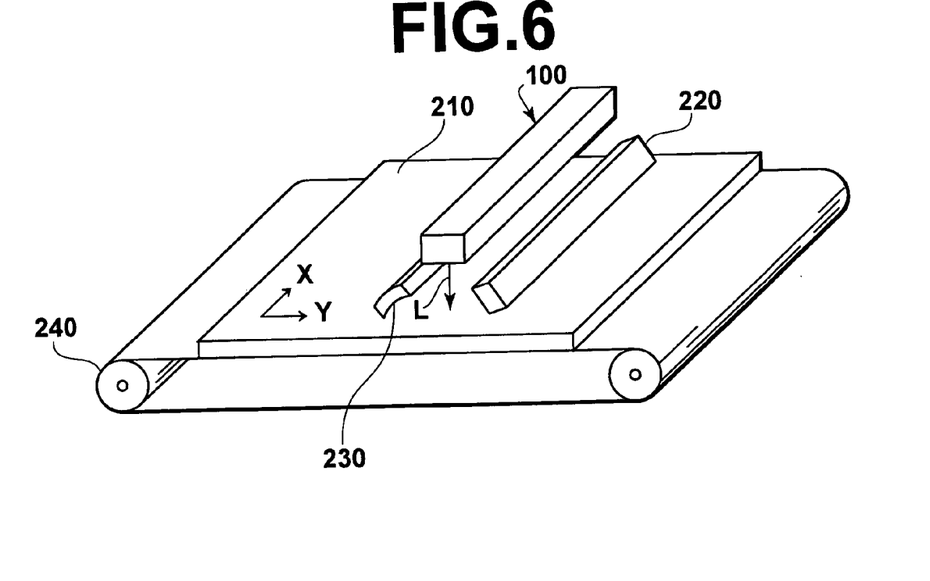
FIG. 6 is a perspective view briefly showing an image read-out system for reading out a radiation image from a stimulable phosphor sheet employing a line light source system in accordance with a second embodiment of the present invention.
Figure 7:
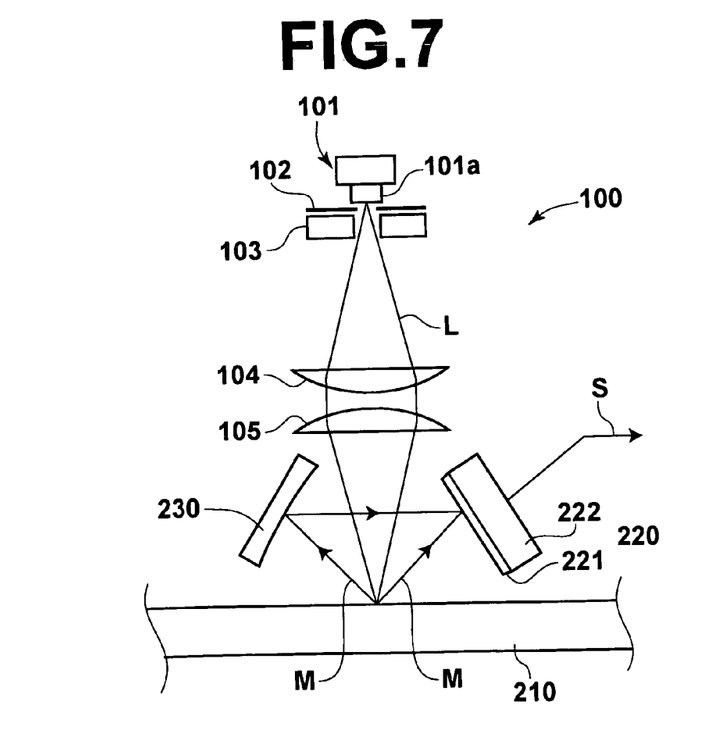
FIG. 7 is an enlarged cross-sectional view showing in detail the line light source system of the second embodiment.

A second embodiment of the present invention will be described with reference to FIG. 6, hereinbelow. FIG. 6 is a perspective view briefly showing an image read-out system for reading out a radiation image from a stimulable phosphor sheet employing a line light source system 100 in accordance with a second embodiment of the present invention. FIG. 7 is an enlarged cross-sectional view showing in detail the line light source system of the second embodiment.

The image read-out system of this embodiment comprises a line light source system 100 in accordance with a second embodiment of the present invention which projects reading light (stimulating light) L onto a stimulable phosphor sheet 210 on which radiation image information has been recorded, a photo sensor 220 which extends in the direction of arrow X (the main scanning direction) and detects stimulated emission M, light emitted from the stimulable phosphor sheet 210 upon exposure to the stimulating light L, a stimulating light cut filter 221 which is disposed on the light inlet side of the photo sensor 220 to prevent the stimulating light L from impinging upon the photo sensor 220, a condenser mirror 230 which efficiently leads the stimulated emission M to the light inlet face of the photo sensor 220, a sheet conveyor means (a belt conveyor) 240 which conveys the stimulable phosphor sheet 210 in the direction of arrow Y (the sub-scanning direction), and a signal processing section (not shown) connected to the photo sensor 220. The photo sensor 220 comprises a plurality of photoelectric convertor elements 222 which are arranged in the direction of arrow X to detect the stimulated emission M emitted from the corresponding pixels on the stimulable phosphor sheet 210. For example, the photoelectric convertor element 222 may be an amorphous silicon, a CCD sensor or an MOS sensor.

The operation of the image read-out system will be described, hereinbelow. Line stimulating light beam L is projected onto the stimulable phosphor sheet 210 by the line light source system 100 while the stimulable phosphor sheet 210 is conveyed in the direction of arrow Y, whereby the entire area of the stimulable phosphor sheet 210 is exposed to the stimulating light beam L.

Stimulated emission M is emitted from the part of the stimulable phosphor sheet 210 exposed to the stimulating light beam L in an amount corresponding to the radiation image information stored therein. The stimulated emission M is diffused all the directions. Apart of the stimulated emission M directly impinges upon the light inlet face of the photo sensor 220 and another part of the stimulated emission impinges upon the light inlet face of the photo sensor 220 after reflected by the condenser mirror 230. At this time, stimulating light L which is reflected by the surface of the stimulable phosphor sheet 210 to mingle in the stimulated emission M is cut by the stimulating light cut filter 221. The stimulated emission M detected by the photo sensor 220 is photoelectrically converted and amplified by the photoelectric convertor element 222 and outputted to the signal processing section as a image signal component S for the corresponding pixel.

The LED chips of the line light source system 100 output stimulating light of a wavelength suitable to cause the stimulable phosphor sheet 210 to emit stimulated emission. //

A line light source system in accordance with a third embodiment of the present invention will be described with reference to FIGS. 10 and 11, hereinbelow. The line light source system of this embodiment is basically the same as that of the first embodiment shown in FIGS. 2A and 2B, and accordingly, the elements analogous to those shown in FIGS. 2A and 2B are given the same reference numerals and will not be described in detail here.

In this embodiment, the pinhole array 103 comprises a light-absorbing plate member provided with a plurality of pinholes AP1, AP2, AP3 . . . each of which is coaxial with the axis of light emission of one of the LED chips 101$a$, 101$b$, 101$c$ . . . . Each of the pinholes AP1, AP2, AP3 . . . limits the angle of divergence $\phi$ of light emitted from the corresponding LED chips.

Limitation of the angle of divergence $\phi$ will be described in detail with reference to FIG. 10, hereinbelow. Though description will be made on the light bundle L1 from the LED chip 101$a$ by way of example, the angle of divergence $\phi$ of the light bundles L2, L3 . . . from the other LED chips 101$b$, 110$c$ . . . are limited in the same manner. Assuming that the distance between the front imaging point (The LED chip 101$a$ is disposed so that its light emitting point is positioned here.) and the back focus of the cylindrical lenses 104 and 105 is D, and a desired focal depth is z, any part of the light bundle L1 is imaged on a point T1 which is apart from the surface of the recording medium 10 to be exposed within the focal depth z when $\Delta D(=D-1)$ is not larger than the focal depth z, whereby good imaging properties can be obtained.

Since $1=D\cdot\cos(\phi/2)$, $\Delta D=D-1=D[1-\cos(\phi/2)]$. That is, the condition that $\Delta D(=D-1)$ is not larger than the focal depth z can be rewritten as follows.

$$D[1-\cos(\phi/2)] \leq z$$

Accordingly, $$1 - \frac{z}{D} \leq \cos\left(\frac{\phi}{2}\right) \to \cos^{-1}\left(1 - \frac{z}{D}\right) \geq \frac{\phi}{2} \to 2 \times \cos^{-1}\left(1 - \frac{z}{D}\right) \geq \phi$$

So long as the above formula is satisfied, any part of the light bundle L1 is imaged on a point T1 which is apart from the surface of the recording medium 10 to be exposed within the focal depth z, whereby good imaging properties can be obtained.

For example, when the desired focal depth z is 0.1 mm, and the distance D is 30 mm, the angle of divergence φ should be not larger than 9.4° (from the above formula). When the desired focal depth z is 0.2 mm, and the distance D is 30 mm, the angle of divergence φ should be not larger than 13.2° (from the above formula). When the desired focal depth z is 0.05 mm, and the distance D is 10 mm, the angle of divergence φ should be not larger than 16.2° (from the above formula).

A line light source system in accordance with a fourth embodiment of the present invention will be described with reference to FIGS. 12 and 13, hereinbelow. The line light source system of this embodiment differs from that of the third embodiment shown in FIGS. 10 and 11 in that a refractive index profile type lens array 103' is employed in place of the pinhole array 103 as the optical element to limit the angle of divergence φ of the light, and accordingly, the elements analogous to those shown in FIGS. 10 and 11 are given the same reference numerals and will not be described in detail here.

In this embodiment, the refractive index profile type lens array 103' comprises a plurality of refractive index profile type lenses SL1, SL2, SL3 . . . which are integrated so that each of which is coaxial with the axis of light emission of one of the LED chips 101a, 101b, 101c . . . . Each of the refractive index profile type lenses SL1, SL2, SL3 . . . limits the angle of divergence φ of light emitted from the corresponding LED chips.

Limitation of the angle of divergence φ will be described in detail with reference to FIG. 12, hereinbelow. Though description will be made on the light bundle L1 from the LED chip 101a by way of example, the angle of divergence φ of the light bundles L2, L3 . . . from the other LED chips 10b, 101c . . . are limited in the same manner. In this embodiment, a real image P' of the LED chip 101a (P) is imaged by the refractive index profile type lens SL1 in a plane shown in FIG. 12 where power of the cylindrical lenses 104 and 105 are not active. In FIG. 12, the focal length of the refractive index profile type lens SL1 is indicated at f and the distance between the LED chip 101a and the refractive index profile type lens SL1 is indicated at a. Further, the refractive index profile type lens SL1 is shown as a lens having no length for the purpose of simplicity.

Figure 10:
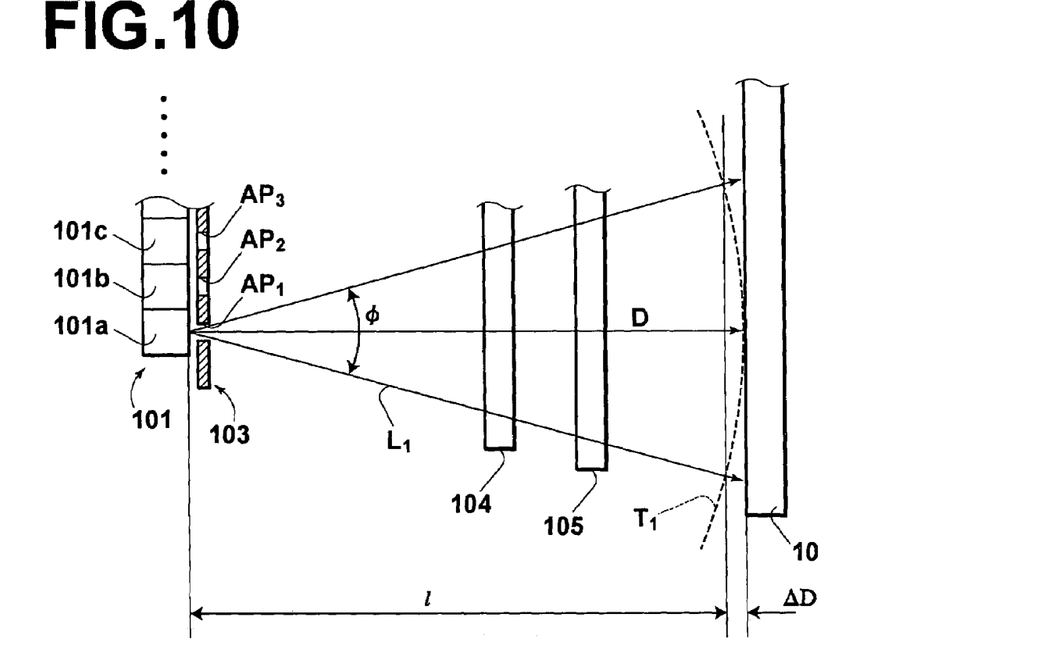
FIG. 10 is a plan view showing in brief a line light source system in accordance with a third embodiment of the present invention.
Figure 11:
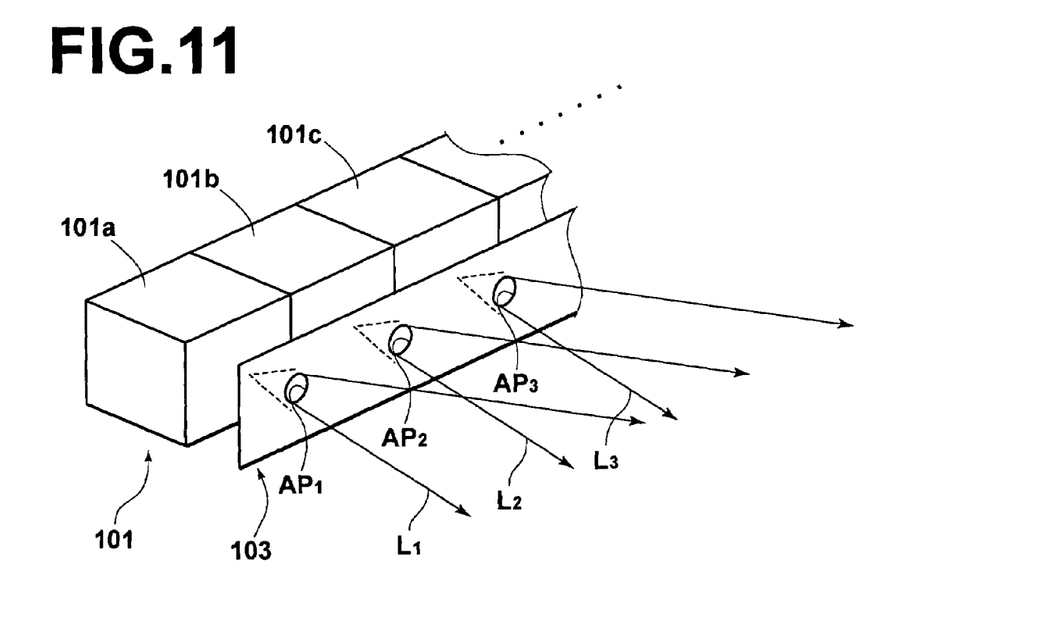
FIG. 11 is a perspective view showing an important part of the line light source system in accordance with the third embodiment of the present invention.
Figure 12:
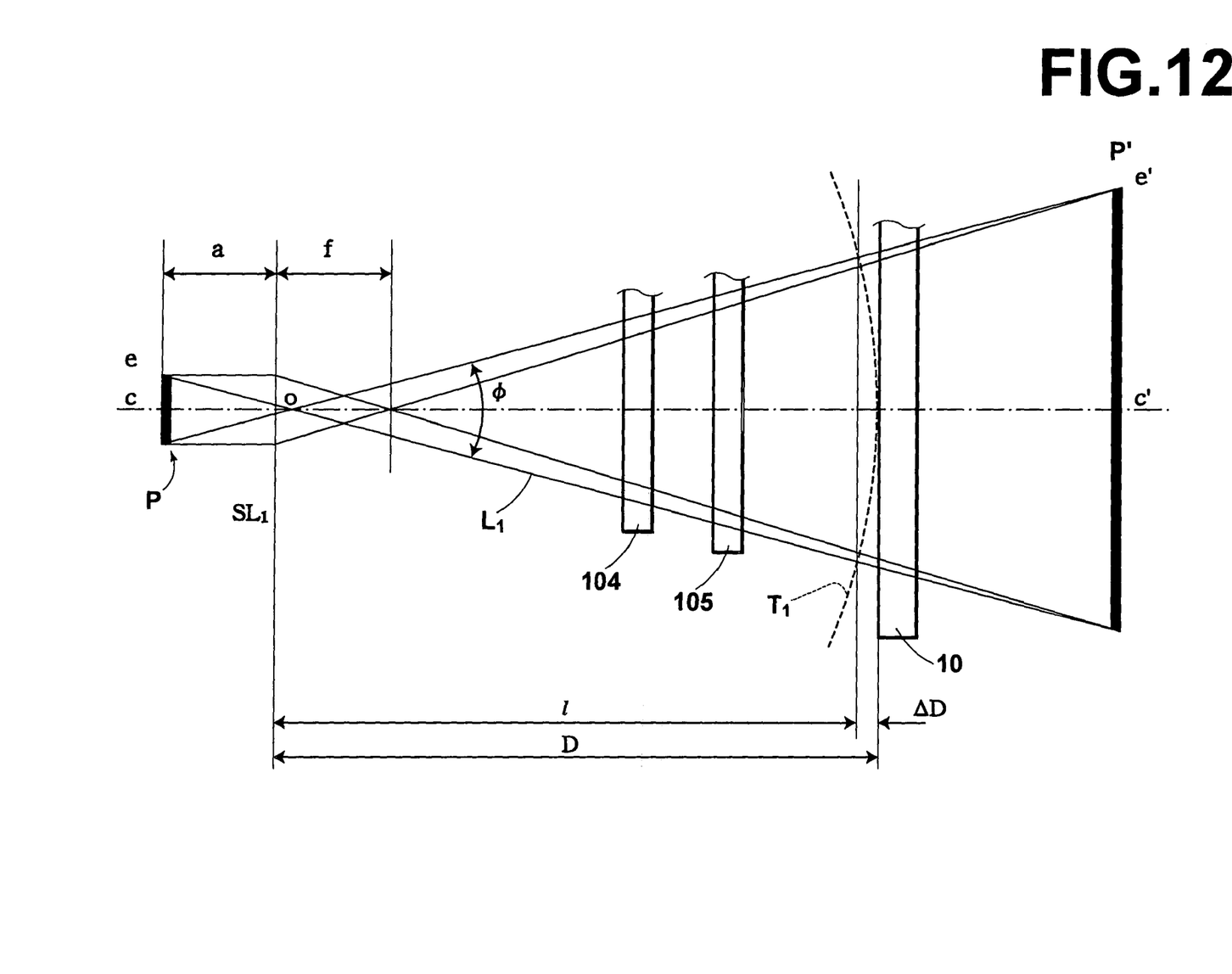
FIG. 12 is a plan view showing in brief a line light source system in accordance with a fourth embodiment of the present invention.
Figure 13:
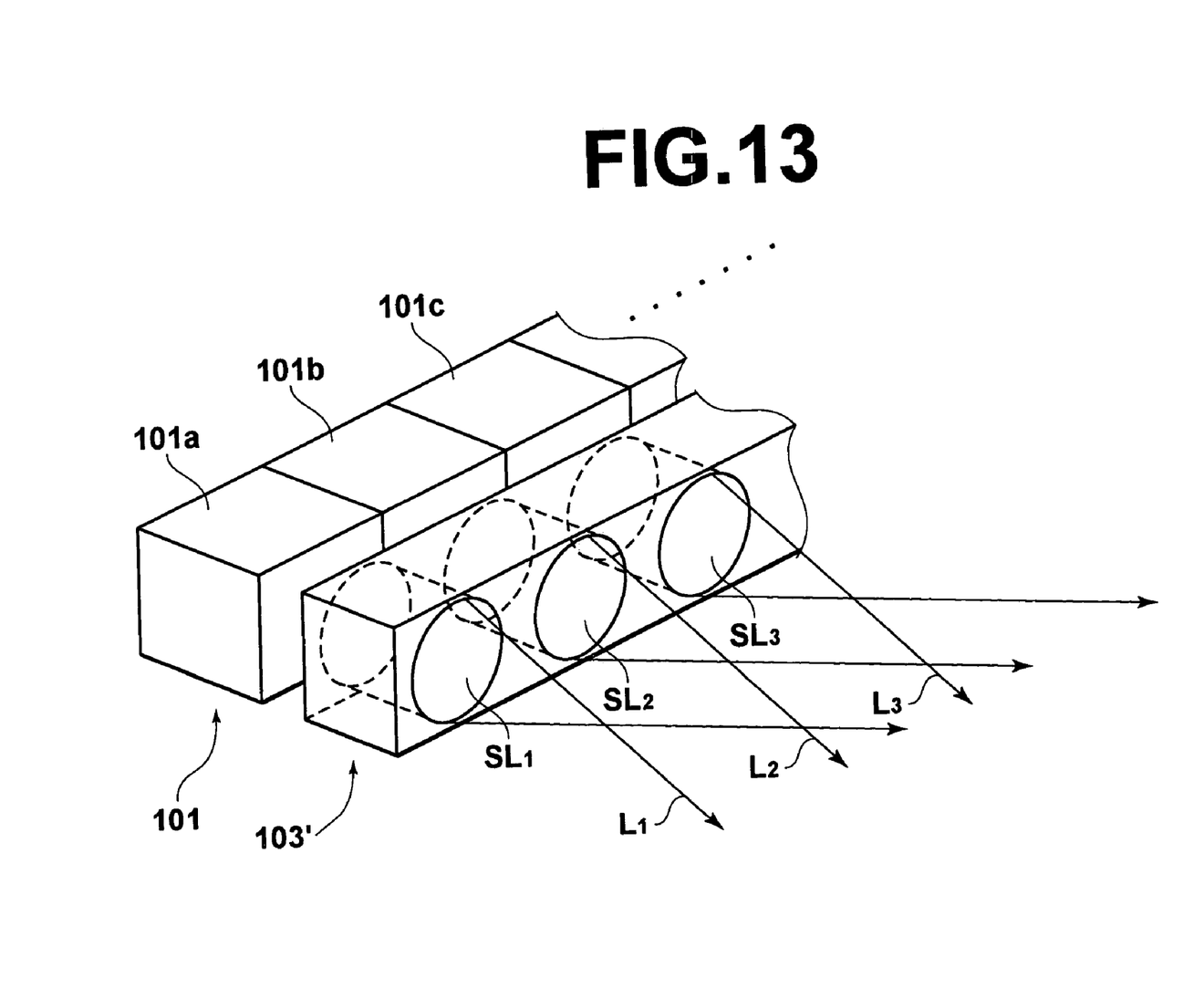
FIG. 13 is a perspective view showing an important part of the line light source system in accordance with the fourth embodiment of the present invention.

As will be clear from the comparison of FIGS. 10 and 12, also in the case where the refractive index profile type lens array 103' is employed in place of the pinhole array 103, any part of the light bundle L1 is imaged on a point T1 which is apart from the surface of the recording medium 10 to be exposed within the focal depth z when the angle of divergence φ of light L1 from the LED chip 101a is limited within the range defined by formula $$2 \times \cos^{-1}\left(1 - \frac{z}{D}\right) \geq \phi$$

by the refractive index profile type lens SL1, whereby good imaging properties can be obtained.

Detailed conditions for satisfying the above formula in the case where the refractive index profile type lens array 103' is employed will be described hereinbelow. Assuming that the size of the light source P is s, ∠coe=∠c'oe'=φ/2 in FIG. 12. Accordingly, $$\frac{\phi}{2} = \tan^{-1}\left(\frac{s/2}{a}\right)$$

The following formula can be derived from this formula together with the above formula $$2 \times \cos^{-1}\left(1 - \frac{z}{D}\right) \geq \phi.$$

$$\cos^{-1}\left(1 - \frac{z}{D}\right) \geq \tan^{-1}\frac{s/2}{a}$$

Since the effective size of the light source P depends upon the angular aperture of the refractive index profile type lens SL1, θ max=no·√A·ro assuming that a maximum angle of incidence of the light bundle L1 to the refractive index profile type lens SL1 is θ max, the axial refractive index of the refractive index profile type lens SL1 is no, the radius of the refractive index profile type lens SL1 is ro and the refractive index profile constant is A. When the effective size 2a·tan(θ max) of the light source P is smaller than the size s of the light source P, it is necessary that $$\cos^{-1}\left(1 - \frac{z}{D}\right) \geq \theta \text{ max.}$$

For example, when the desired focal depth z is 0.1 mm, and the distance D is 30 mm, the maximum angle θ max of incidence of the light bundle L1 to the refractive index profile type lens SL1 should be not larger than 6.6° (from the above formula) When the desired focal depth z is 0.1 mm, and the distance D is 20 mm, the maximum angle θ max of incidence of the light bundle L1 to the refractive index profile type lens SL1 should be not larger than 5.7° (from the above formula).

Though, in the embodiments described above, an LED array comprising a number of linearly arranged LED chips is employed as a light emitting element array, the present invention can be applied to line light source systems in which a light emitting element array other than the LED array is employed. For example, a line light source comprising one or more inorganic or organic EL can be employed as a light emitting element array. Since such a line light source can be regarded as a light source comprising a number of continuously arranged light emitting areas, employment of such a line light source results in similar result. Further when such a line light source is employed, pinholes can be formed at desired pitches.

What is claimed is:

1. A line light source system comprising a light emitting element array comprising a number of linearly arranged light emitting elements and a cylindrical lens which converges the divergent light bundles emitted from the respective light emitting elements only in a direction perpendicular to the direction in which the light emitting elements are arranged so that the divergent light bundles are converged on a line-like area on a surface to be exposed to the light emitted from the line light source, wherein the improvement comprises an optical element which limits the angle of divergence $\phi$ of light traveling toward the surface within the range defined by formula $$2 \times \cos^{-1}\left(1 - \frac{z}{D}\right) \geq \phi$$

wherein D represents the distance between the front imaging point and the back focus of the cylindrical lens, and z represents a desired focal depth.

2. A line light source system as defined in claim 1 in which said light emitting element array is an LED array.

3. A line light source system as defined in claim 1 which is for projecting a reading light beam onto an electrostatic recording medium which stores image information as an electrostatic latent image upon exposure to light bearing thereon image information and generates an electric current according to the image information upon exposure to the reading light.

4. A line light source system as defined in claim 1 which is for projecting a reading light beam onto a stimulable phosphor sheet which stores the image information upon exposure to light bearing thereon image information and emits light according to the image information stored therein upon exposure to the reading light.

5. A line light source system as defined in claim 1 in which said optical element is a pinhole array.

6. A line light source system as defined in claim 1 in which said optical element is a refractive index profile type lens array.

7. A line light source system comprising a line light source, an optical means which converges the light bundles emitted from the line light source in a direction perpendicular to the longitudinal direction of the line light source, and a pinhole array which limits the angle of divergence of the light bundles emitted from the line light source to substantially 10° or less with respect to each direction.

8. The line light source of claim 7, wherein the pinholes have a rectangular shape.

* * * * *